G. GRADVILLE.
THREAD CUTTING DIE.
APPLICATION FILED MAY 6, 1919.

1,326,047.  Patented Dec. 23, 1919.

Witness
Thos. W. Riley

Inventor
G Gradville
By W. J. Fitz Gerald & Co.
Attorney

UNITED STATES PATENT OFFICE.

GEORGE GRADVILLE, OF HAVELOCK, NEBRASKA.

THREAD-CUTTING DIE.

1,326,047.     Specification of Letters Patent.     Patented Dec. 23, 1919.

Application filed May 6, 1919. Serial No. 295,042.

*To all whom it may concern:*

Be it known that I, GEORGE GRADVILLE, a citizen of the United States, residing at Havelock, in the county of Lancaster and State of Nebraska, have invented certain new and useful Improvements in Thread-Cutting Dies; and I do hereby declare the following to be a full, clear, and exact description of the invention, such as will enable others skilled in the art to which it appertains to make and use the same.

The present invention relates to thread cutting dies, and aims to provide a simple, inexpensive and compact device which is constructed and adjustable for chasing or cutting threads on pipes, rods and other objects of different diameters within certain limits for which the device is constructed.

As a more specific object, the invention aims to provide a pair of elongated die members or bars having thread cutters between them or at their adjacent edges, and novel means for connecting said bars to adjust them relatively for pipes or rods of slightly different diameters.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein—

Figure 1:
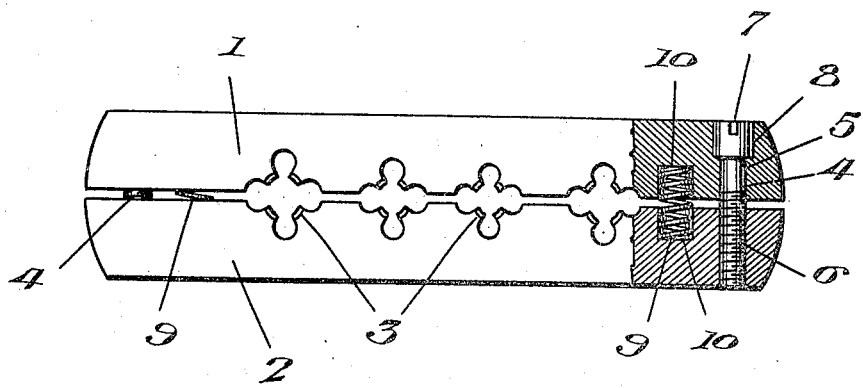
Figure 1 is a side elevation of the die, portions being shown in section.
Figure 2:
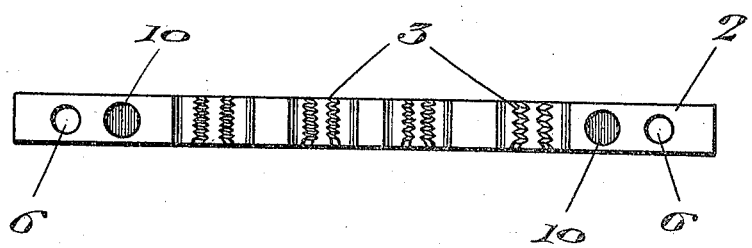
Fig. 2 is an inner edge view of one die member or bar.

The thread cutting die comprises a pair of elongated members or bars 1 and 2 disposed edge to edge, and having their sides flush and their ends rounded in order that they can be held in a suitable die stock or holder. The adjacent edges of the bars are provided with thread cutters 3 and recesses, at longitudinally spaced points between the ends of the bars 1, for cutting threads of different diameters and pitches, and said bars are adjusted relatively to accommodate pipes or rods of slightly different diameters.

In order to secure the bars together and afford means for adjusting them relatively, transverse screws 4 are provided at the opposite ends of the bars and extend loosely through apertures 5 extending through the bars 1 adjacent to the ends thereof, and said screws threadedly engage within threaded apertures 6 extending transversely through the bar 2 near its ends. The heads 7 of the screws are seated within recesses 8 in the bar 1, and said screws can be readily turned by means of a screw driver or other suitable implement, in order to adjust the bars 1 and 2 toward and away from one another.

The bars are yieldably separated by means of coiled wire expansion springs 9 disposed between the screws 4 and the cutters 3, said springs being seated in recesses or sockets 10 provided in the inner edges of the bars between the cutters and apertures. Thus, when the screws 4 are unscrewed, the springs 9 will separate the bars 1 and 2 for objects of larger diameters, and said springs serve to move the bars apart while the screws are operable to move them together, and also hold the bars assembled as a unit. The screws and springs are located in the outline and exterior surfaces of the bars 1 and 2, so as not to obstruct the die or interfere with the use thereof in an ordinary die stock or holder.

Having thus described the invention, what is claimed as new is:—

1. A thread cutting die comprising a pair of bars disposed edge to edge, screws extending through the bars near the ends thereof, and springs between the bars near their ends for separating them.

2. A thread cutting die embodying a pair of bars disposed edge to edge and having thread cutters at their adjacent edges between their ends and apertures and sockets near their ends, screws rotatable in some of the apertures and threaded into the others, and expansion springs between the bars seated in said sockets.

3. A thread cutting die embodying a pair of bars disposed edge to edge and having thread cutters in their adjacent edges between their ends and apertures and sockets near their ends, some of the apertures being threaded and the others having recesses at the outer edge of one bar, screws in the apertures having heads seated in said recesses and threadedly engaging the threaded apertures, and expansion springs between the bars seated in said sockets, said screws and springs located within the exterior surfaces of said bars.

In testimony whereof I have signed my name to this specification in the presence of two subscribing witnesses.

GEORGE GRADVILLE.

Witnesses:
R. O. TIFF,
I. E. AULT.